United States Patent
Wang

(10) Patent No.: US 8,121,095 B2
(45) Date of Patent: Feb. 21, 2012

(54) SYSTEM AND METHOD FOR ADJUSTING A TIME OFFSET OF GPS SIGNALS IN A CDMA MOBILE PHONE

(75) Inventor: Chun-Chieh Wang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 905 days.

(21) Appl. No.: 12/139,517

(22) Filed: Jun. 16, 2008

(65) Prior Publication Data
US 2009/0143066 A1    Jun. 4, 2009

(30) Foreign Application Priority Data
Nov. 30, 2007 (CN) .......................... 2007 1 0202809

(51) Int. Cl.
*H04B 7/216* (2006.01)
(52) U.S. Cl. ......... 370/335; 370/320; 370/342; 455/425
(58) Field of Classification Search .................. 370/320, 370/335, 342; 375/149; 455/425
See application file for complete search history.

(56) References Cited

U.S. PATENT DOCUMENTS
6,351,236 B1   2/2002  Hasler
2002/0085627 A1*  7/2002  Younis .......................... 375/149
* cited by examiner

*Primary Examiner* — Jeffrey Pwu
*Assistant Examiner* — Farhad Ali
(74) *Attorney, Agent, or Firm* — Altis Law Group, Inc.

(57) ABSTRACT

A method for adjusting a time offset of GPS signals in a CDMA mobile phone includes: generating periodic waves and transmitting to the GPS simulator; generating CDMA RF signals and transmitting to the combiner; clocking a first delay time starting when the periodic waves are transmitted to a time the CDMA RF signals are transmitted; receiving the periodic waves; generating GPS RF signals and transmitting the signals to the combiner; clocking a second delay time starting when the periodic waves are received to a time the GPS RF signals are transmitted; generating combined signals and transmitting to the CDMA mobile phone; clocking a third delay time starting when the CDMA RF signals are received to a time the GPS RF signals are received; and calculating a time offset between CDMA signals and GPS signals according to the first delay time, the second delay time, and the third delay time.

6 Claims, 2 Drawing Sheets

SYSTEM AND METHOD FOR ADJUSTING A TIME OFFSET OF GPS SIGNALS IN A CDMA MOBILE PHONE

BACKGROUND OF THE INVENTION

1. Field of the Invention

The present invention generally relates to systems and methods for adjusting a time offset of global positioning system (GPS) signals in a code division multiple access (CDMA) mobile phone.

2. Description of Related Art

GPS is a satellite-based radio navigation system. There are 24 GPS satellites orbiting the Earth and transmitting radio signals. Based on measurements of the time that the radio signals travel from one of the GPS satellites to a GPS receiver, the GPS receiver calculates a distance and determines a location in terms of longitude, latitude and altitude. The GPS satellites transmit radio signals on two different carrier frequencies: a primary frequency and a secondary frequency. The radio signals are transmitted at the two different carrier frequencies simultaneously, the radio signals having different carrier frequencies do not interfere significantly with each other due to pseudo-random noise (PRN) code modulation. Since each of the GPS satellites is assigned to a unique PRN code and furthermore, all of the PRN code sequences are unrelated with respect to each other, the radio signals can be separated and detected by using the CDMA technology.

A CDMA mobile phone, which is equipped with a GPS and built-in maps, can be used for tracking purposes. In the CDMA mobile phone, CDMA signals and GPS signals are transmitted and processed simultaneously. However, there is a time offset, between the CDMA signals and the GPS signals because of different transmission paths of the CDMA signals and the GPS signals, the time offset would affect the positioning accuracy of the CDMA mobile phones.

Accordingly, what is needed is a system and method for adjusting a time offset of GPS signals in a CDMA mobile phone, which can adjust the time offset between the CDMA signals and the GPS signals of the CDMA mobile phone.

SUMMARY

An exemplary embodiment provides a method for adjusting a time offset of GPS signals in a CDMA mobile phone. The method includes: providing a CDMA communication tester, a GSM simulator, a combiner, and a computer, connecting the CDMA communication tester, the GSM simulator, the combiner, the CDMA mobile phone, and the computer in turn, and connecting the CDMA communication tester to the combiner; generating periodic waves by the CDMA communication tester and transmitting the periodic waves to the GPS simulator; generating CDMA radio frequency (RF) signals by the CDMA communication tester and transmitting the CDMA RF signals to the combiner; clocking a first delay time between a time the CDMA communication tester begin transmitting the periodic waves and a time the CDMA communication tester begin transmitting the CDMA RF signals; receiving the periodic waves by the GPS simulator; generating GPS RF signals by the GPS simulator and transmitting the GPS RF signals to the combiner; clocking a second delay time between a time the GPS simulator begin receiving the periodic waves and a time the GPS simulator begin transmitting the GPS RF signals; generating combined signals through the combiner by combining the CDMA RF signals and the GPS RF signals, and transmitting the combined signals to the CDMA mobile phone; demodulating the combined signals by the CDMA mobile phone, and clocking a third delay time between a time the combiner begin receiving the CDMA RF signals and a time the combiner begin receiving the GPS RF signals; and calculating a time offset between CDMA signals and GPS signals in the CDMA mobile phone according to the first delay time, the second delay time, and the third delay time.

Other systems, methods, features, and advantages will be or become apparent to one skilled in the art upon examination of the following drawings and detailed description.

DETAILED DESCRIPTION OF THE EMBODIMENTS

Figure 1:
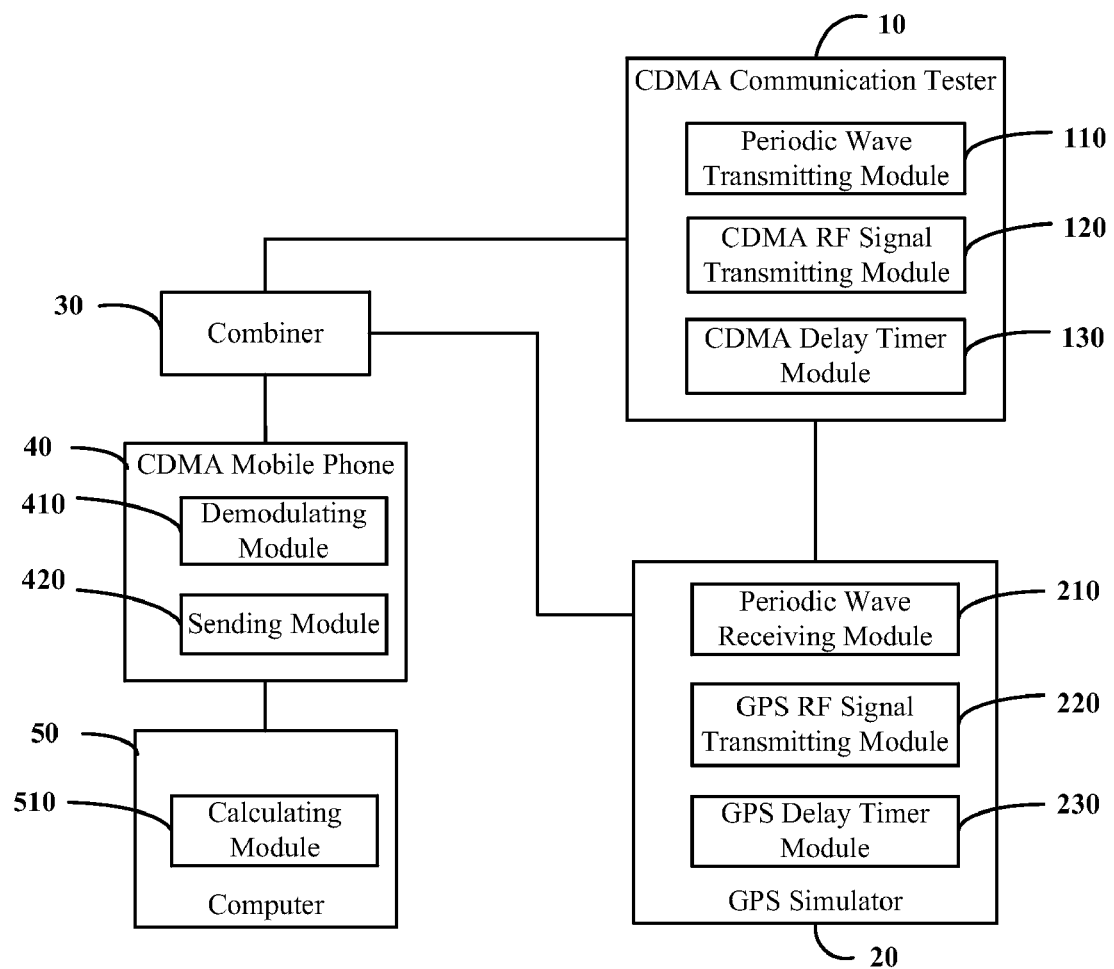
FIG. 1 is a block diagram of a system for adjusting the time offset of GPS signals in a CDMA mobile phone in accordance with an exemplary embodiment.

FIG. 1 is a block diagram of a system for adjusting a time offset of GPS signals in a CDMA mobile phone (hereinafter, "the system") in accordance with an exemplary embodiment. The system typically includes a CDMA communication tester 10, a GSM simulator 20, a combiner 30, a CDMA mobile phone 40, and a computer 50. The CDMA communication tester 10 is connected to the GPS simulator 20. The combiner 30 is connected to the CDMA communication tester 10, the GPS simulator 20, and the CDMA mobile phone 40. The CDMA mobile phone 40 is further connected to the computer 50. The CDMA communication tester 10 includes a periodic wave transmitting module 110, a CDMA radio frequency (RF) signal transmitting module 120, and a CDMA delay timer module 130. The GPS simulator 20 includes a periodic wave receiving module 210, a GPS RF signal transmitting module 220, and a GPS delay timer module 230. The CDMA mobile phone 40 includes a demodulating module 410 and a sending module 420. The computer 50 includes a calculating module 510.

The periodic wave transmitting module 110 is configured for generating periodic waves and transmitting the periodic waves to the GPS simulator 20.

The CDMA RF signal transmitting module 120 is configured for generating CDMA RF signals and transmitting the CDMA RF signals to the combiner 30.

The CDMA delay timer module 130 is configured for clocking a first delay time between a time the CDMA communication tester 10 begin transmitting the periodic waves and a time the CDMA communication tester 10 begin transmitting the CDMA RF signals.

The periodic wave receiving module 210 of the GPS simulator 20 is configured for receiving the periodic waves from the periodic wave transmitting module 110 of the CDMA communication tester 10.

The GPS RF signal transmitting module 220 is configured for generating GPS RF signals and transmitting the GPS RF signals to the combiner 30.

The GPS delay timer module 230 is configured for clocking a second delay time between a time the GPS simulator 20 begin receiving the periodic waves and a time the GPS simulator 20 begin transmitting the GPS RF signals.

The combiner 30 is configured for receiving the CDMA RF signals and the GPS RF signals, generating combined signals by combining the CDMA RF signals and the GPS RF signals, and transmitting the combined signals to the CDMA mobile phone 40.

The demodulating module 410 is configured for demodulating the combined signals, and clocking a third delay time between a time the combiner 30 begin receiving the CDMA RF signals and a time the combiner 30 begin receiving the GPS RF signals. For example, when the CDMA RF signals and the GPS RF signals are received 20 milliseconds (ms) apart by the combiner 30, the first 20 ms of the combined signals basically contains only the CDMA RF signals. Therefore, the demodulating module 410 clocks the third delay time is 20 ms after demodulating the combined signals.

The sending module 420 is configured for sending the third delay time to the computer 50.

The calculating module 510 is configured for calculating a time offset between CDMA signals and GPS signals in the CDMA mobile phone 40 according to the first delay time, the second delay time, and the third delay time. The time offset between the CDMA signals and the GPS signals in the CDMA mobile phone 40 is configured for adjusting and synchronizing the CDMA signals and the GPS signals in the CDMA mobile phone 40. The time offset between the CDMA signals and the GPS signals in the CDMA mobile phone 40 is equal to the third delay time plus the second delay time, minus the first delay time. For example, if the first delay time is 30 ms, the second delay time is 40 ms, the third delay time is 20 ms, the time offset between the CDMA signals and the GPS signals is equal to 20 ms+40 ms−30 ms=30 ms.

Figure 2:
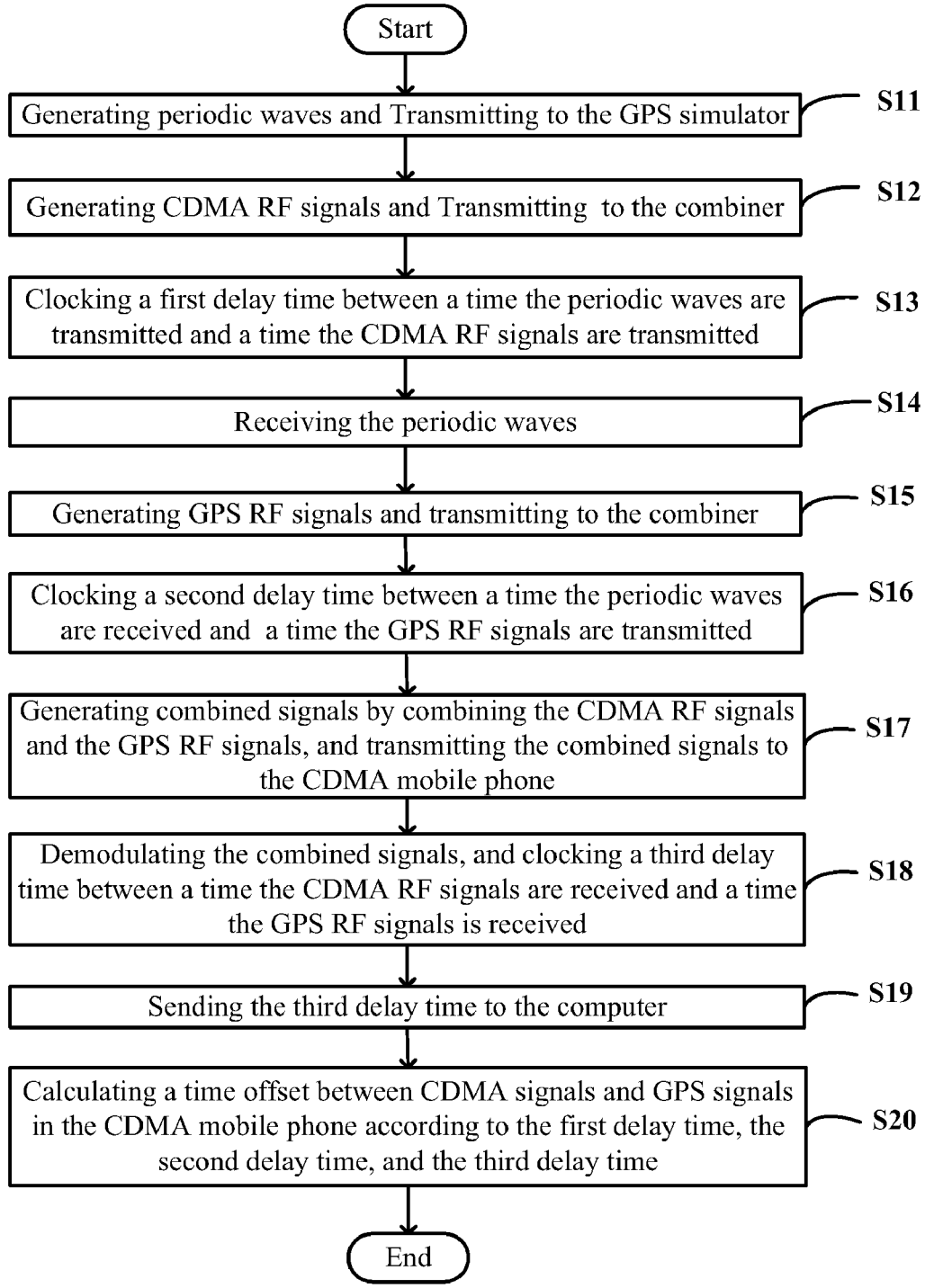
FIG. 2 is a flowchart of a method for adjusting a time offset of GPS signals in a CDMA mobile phone in accordance with the exemplary embodiment.

FIG. 2 is a flowchart of a method for adjusting a time offset of GPS signals in a CDMA mobile phone in accordance with the exemplary embodiment.

In step S11, the periodic wave transmitting module 110 generates the periodic waves and transmits the periodic waves to the GPS simulator 20.

In step S12, the CDMA RF signal transmitting module 120 generates the CDMA RF signals and transmits the CDMA RF signals to the combiner 30.

In step S13, the CDMA delay timer module 130 clocks the first delay time between a time the CDMA communication tester 10 begin transmitting the periodic waves and a time the CDMA communication tester 10 begin transmitting the CDMA RF signals.

In step S14, the periodic wave receiving module 210 of the GPS simulator 20 receives the periodic waves from the periodic wave transmitting module 110 of the CDMA communication tester 10.

In step S15, the GPS RF signal transmitting module 220 generates the GPS RF signals and transmits the GPS RF signals to the combiner 30.

In step S16, the GPS delay timer module 230 clocks a second delay time between a time the GPS simulator 20 begin receiving the periodic waves and a time the GPS simulator 20 begin transmitting the GPS RF signals.

In step S17, the combiner 30 generates the combined signals by combining the CDMA RF signals and the GPS RF signals, and transmits the combined signals to the CDMA mobile phone 40.

In step S18, the demodulating module 410 demodulates the combined signals, and clocks the third delay time between a time the combiner 30 begin receiving the CDMA RF signals and a time the combiner 30 begin receiving the GPS RF signals.

In step S19, the sending module 420 sends the third delay time to the computer 50.

In step S20, the calculating module 510 calculates the time offset between the CDMA signals and the GPS signals in the CDMA mobile phone 40 according to the first delay time, the second delay time, and the third delay time. The time offset between the CDMA signals and the GPS signals in the CDMA mobile phone 40 is configured for adjusting and synchronizing the CDMA signals and the GPS signals in the CDMA mobile phone 40. The time offset between the CDMA signals and the GPS signals in the CDMA mobile phone 40 is equal to the third delay time plus the second delay time, minus the first delay time.

It should be emphasized that the above-described embodiments of the exemplary embodiments are merely possible examples of implementations, merely set forth for a clear understanding of the principles of the invention. Many variations and modifications may be made to the above-described exemplary embodiment without departing substantially from the spirit and principles of the invention. All such modifications and variations are intended to be included herein within the scope of this disclosure and the above-described exemplary embodiment and protected by the following claims.

What is claimed is:

1. A system for adjusting a time offset of global position system (GPS) signals in a code division multiple access (CDMA) mobile phone, the system comprising a CDMA communication tester, a GSM simulator, a combiner, the CDMA mobile phone, and a computer connected in turn, the CDMA communication tester is further connected to the combiner, the CDMA communication tester comprising:
   a periodic wave transmitting module configured for generating periodic waves and transmitting the periodic waves to the GPS simulator;
   a CDMA radio frequency (RF) signal transmitting module configured for generating CDMA RF signals and transmitting the CDMA RF signals to the combiner;
   a CDMA delay timer module configured for clocking a first delay time between a time the CDMA communication tester begin transmitting the periodic waves and a time the CDMA communication tester begin transmitting the CDMA RF signals;
   the GPS simulator comprising:
   a periodic wave receiving module configured for receiving the periodic waves from the periodic wave transmitting module;
   a GPS RF signal transmitting module configured for generating GPS RF signals and transmitting the GPS RF signals to the combiner;
   a GPS delay timer module configured for clocking a second delay time between a time the GPS simulator begin receiving the periodic waves and a time the GPS simulator begin transmitting the GPS RF signals;
   the combiner being configured for generating combined signals by combining the CDMA RF signals and the GPS RF signals, and transmitting the combined signals to the CDMA mobile phone;
   the CDMA mobile phone comprising:
   a demodulating module configured for demodulating the combined signals, and clocking a third delay time between a time the combiner begin receiving the CDMA RF signals and a time the combiner begin receiving the GPS RF signals; and
   the computer comprising a calculating module configured for calculating a time offset between CDMA signals and GPS signals in the CDMA mobile phone according to the first delay time, the second delay time, and the third delay time, and synchronizing the CDMA signals and the GPS signals in the CDMA mobile phone using the time offset.

2. The system according to claim 1, wherein the CDMA mobile phone further comprises a sending module configured for sending the third delay time to the computer.

3. The system according to claim 1, wherein the time offset between the CDMA signals and the GPS signals in the CDMA mobile phone is equal to the third delay time plus the second delay time, minus the first delay time.

4. A method for adjusting a time offset of global position system (GPS) signals in a code division multiple access (CDMA) mobile phone, the method comprising:
   providing a CDMA communication tester, a GSM simulator, a combiner, and a computer, connecting the CDMA communication tester, the GSM simulator, the combiner, the CDMA mobile phone, and the computer, respectively, and connecting the CDMA communication tester to the combiner;
   generating periodic waves by the CDMA communication tester and transmitting the periodic waves to the GPS simulator;
   generating CDMA radio frequency (RF) signals by the CDMA communication tester and transmitting the CDMA RF signals to the combiner;
   clocking a first delay time between a time the CDMA communication tester begin transmitting the periodic waves and a time the CDMA communication tester begin transmitting the CDMA RF signals;
   receiving the periodic waves by the GPS simulator;
   generating GPS RF signals by the GPS simulator and transmitting the GPS RF signals to the combiner;
   clocking a second delay time between a time the GPS simulator begin receiving the periodic waves and a time the GPS simulator begin transmitting the GPS RF signals;
   generating combined signals through the combiner by combining the CDMA RF signals and the GPS RF signals, and transmitting the combined signals to the CDMA mobile phone;
   demodulating the combined signals by the CDMA mobile phone, and clocking a third delay time between a time the combiner begin receiving the CDMA RF signals and a time the combiner begin receiving the GPS RF signals;
   calculating a time offset between CDMA signals and GPS signals in the CDMA mobile phone according to the first delay time, the second delay time, and the third delay time; and
   synchronizing the CDMA signals and the GPS signals in the CDMA mobile phone using the time offset.

5. The method according to claim 4, further comprising: sending the third delay time to the computer before the calculating step.

6. The method according to claim 4, the time offset between the CDMA signals and the GPS signals in the CDMA mobile phone is equal to the third delay time plus the second delay time, minus the first delay time.

* * * * *